(12) United States Patent
Akahori et al.

(10) Patent No.: US 12,158,180 B2
(45) Date of Patent: Dec. 3, 2024

(54) FLUID DYNAMIC BEARING, SPINDLE MOTOR, HARD DISK DRIVE DEVICE

(71) Applicant: MINEBEA MITSUMI Inc., Nagano (JP)

(72) Inventors: Tadashi Akahori, Nagano (JP); Kazuya Iinuma, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 105 days.

(21) Appl. No.: 18/056,288

(22) Filed: Nov. 17, 2022

(65) Prior Publication Data

US 2023/0175549 A1 Jun. 8, 2023

(30) Foreign Application Priority Data

Dec. 7, 2021 (JP) ................ 2021-198467

(51) Int. Cl.
*F16C 17/10* (2006.01)
*F16C 33/10* (2006.01)
(52) U.S. Cl.
CPC .......... *F16C 17/105* (2013.01); *F16C 33/107* (2013.01); *F16C 33/1085* (2013.01); *F16C 2370/12* (2013.01)

(58) Field of Classification Search
CPC .... F16C 17/10; F16C 17/105; F16C 33/1055; F16C 33/107; F16C 33/1085
See application file for complete search history.

(56) References Cited

U.S. PATENT DOCUMENTS

| | | | |
|---|---|---|---|
| 6,962,442 B2 | 11/2005 | Braun | |
| 8,687,317 B1* | 4/2014 | Shinao | ................ F16C 17/105 360/99.08 |
| 10,393,171 B2* | 8/2019 | Showa | ................ F16C 17/105 |
| 2005/0025401 A1 | 2/2005 | Braun | |

FOREIGN PATENT DOCUMENTS

JP 2005-054990 A 3/2005

* cited by examiner

*Primary Examiner* — James Pilkington
(74) *Attorney, Agent, or Firm* — Pearne & Gordon LLP (57) ABSTRACT

A conical bearing member includes a communication hole communicating an inner peripheral surface and an outer peripheral surface of the conical bearing member, and the inner peripheral surface includes a press-fit region in contact with a shaft and an enlarged diameter region having a diameter greater than a diameter of the press-fit region and including an inner opening part of the communication hole. A tapered part having a diameter increasing toward the enlarged diameter region is provided at an end part of the press-fit region on the enlarged diameter region side.

8 Claims, 13 Drawing Sheets

FLUID DYNAMIC BEARING, SPINDLE MOTOR, HARD DISK DRIVE DEVICE

CROSS-REFERENCE TO RELATED APPLICATIONS

This application claims the benefit of priority to Japanese Patent Application Number 2021-198467 filed on Dec. 7, 2021. The entire contents of the above-identified application are hereby incorporated by reference.

TECHNICAL FIELD

The present disclosure relates to a fluid dynamic bearing with improved accuracy of an axial clearance between a conical bearing member and a conical inner peripheral surface of a sleeve part, and a spindle motor and a hard disk drive device using the fluid dynamic bearing.

BACKGROUND

A fluid dynamic bearing and a spindle motor using two conical bearing members are known. (For example, see JP 2005-054990 A).

SUMMARY

In a spindle motor using a conical bearing member, an axial clearance between a conical bearing member and a conical inner peripheral surface of a sleeve part greatly affects bearing loss characteristics and shaft rigidity characteristics. One of the possible causes affecting the axial clearance is an unstable press fit between the conical bearing member and a shaft. This is because a press-fit position is not stable due to the occurrence of uneven galling (uneven contact), in a circumferential direction, between a lower end part of a press-fit region provided at an inner periphery of the conical bearing member and an upper end part of a press-fit part at an outer periphery of the shaft. The possible causes of the galling are as follows.

In the conical bearing member, a communication hole communicating an inner peripheral surface and an outer peripheral surface of the conical bearing member is formed by machining, and an annular communication passage is formed by electrochemical machining for removal of burrs generated at an edge of an opening part (inner opening part) of the communication hole at the inner peripheral surface. Galling occurs because the edge part of the annular communication passage is not smooth. Moreover, when an electrode and a component are set at an angle during the electrochemical machining, the degree of machining varies in the circumferential direction, and when the shaft is press-fitted, the distal edge part of the shaft comes into uneven contact with the edge part of the annular communication passage. This uneven contact is also thought to be the cause of the galling.

The present disclosure has been made in view of the above circumstances, and an object of the present disclosure is to improve the accuracy of an axial clearance between a conical bearing member and a conical inner peripheral surface of a sleeve part by preventing the occurrence of galling between an inner periphery of the conical bearing member and an outer periphery of a shaft.

The present disclosure is a fluid dynamic bearing includes a conical bearing member press-fitted with a shaft, wherein the conical bearing member includes a communication hole communicating an inner peripheral surface and an outer peripheral surface of the conical bearing member, the inner peripheral surface includes a press-fit region in contact with the shaft and an enlarged diameter region having a larger diameter than the press-fit region and including an inner opening part of the communication hole, and a tapered part is provided at an end part of the press-fit region on a side of the enlarged diameter region, the tapered part having a diameter increasing toward the enlarged diameter region.

Furthermore, the present disclosure is a manufacturing method of a fluid dynamic bearing includes a first machining step of machining an enlarged diameter region and a tapered part, the enlarged diameter region being at an inner peripheral surface of a conical bearing member, the conical bearing member including an outer peripheral surface and the inner peripheral surface, the inner peripheral surface including a press-fit region press-fitted with a shaft, the enlarged diameter region having a diameter greater than a diameter of the press-fit region, the tapered part being at an end part of the press-fit region on a side of the enlarged diameter region, the tapered part having a diameter increasing toward the enlarged diameter region, a second machining step of forming a communication hole communicating the outer peripheral surface and the enlarged diameter region, and an electrochemical machining step of electrochemically machining and finishing the enlarged diameter region including an inner opening part of the communicating hole.

The present disclosure provides a fluid dynamic bearing with improved accuracy of an axial clearance between a conical bearing member and a conical inner peripheral surface of a sleeve part by preventing the occurrence of galling between an inner periphery of the conical bearing member and an outer periphery of a shaft, and a spindle motor using the fluid dynamic bearing.

BRIEF DESCRIPTION OF DRAWINGS

FIG. 6A to FIG. 6D are cross-sectional views illustrating a manufacturing process of the conical bearing member according to the embodiment.

DESCRIPTION OF EMBODIMENTS

1. Hard Disk Drive Device

Figure 1:
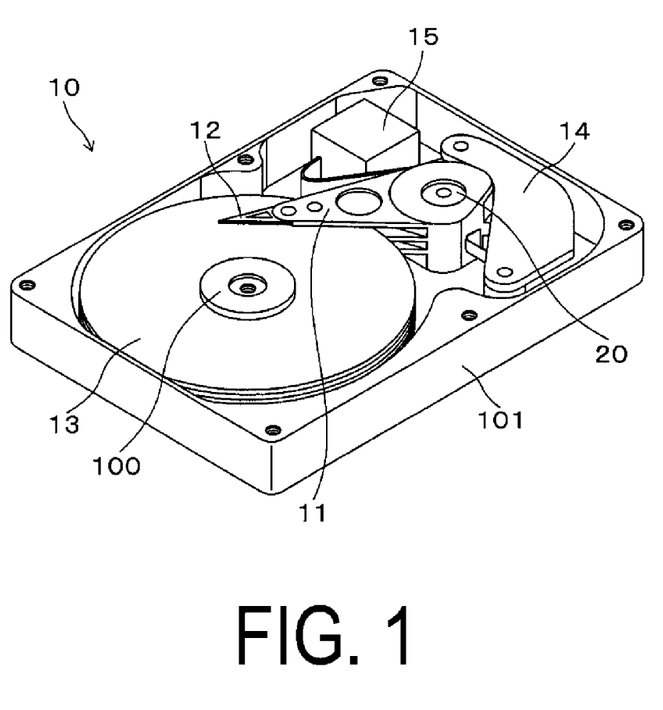
FIG. 1 is a perspective view schematically illustrating a hard disk drive device of an embodiment of the present disclosure.

FIG. 1 is a perspective view schematically illustrating an overall configuration of a hard disk drive device 10 according to an embodiment of the present disclosure. The hard disk drive device 10 includes, at a base part 101, a spindle motor 100 and a plurality of hard disks 13 attached to the spindle motor 100 to rotate. The hard disk drive device 10 also includes a swing arm 11 supporting a plurality of magnetic heads 12 facing the respective hard disks 13, an actuator 14 driving the swing arm 11, and a control unit 15 controlling these units. The swing arm 11 is supported via a pivot assembly bearing 20 attached to the base part 101.

2. Spindle Motor

Figure 2:
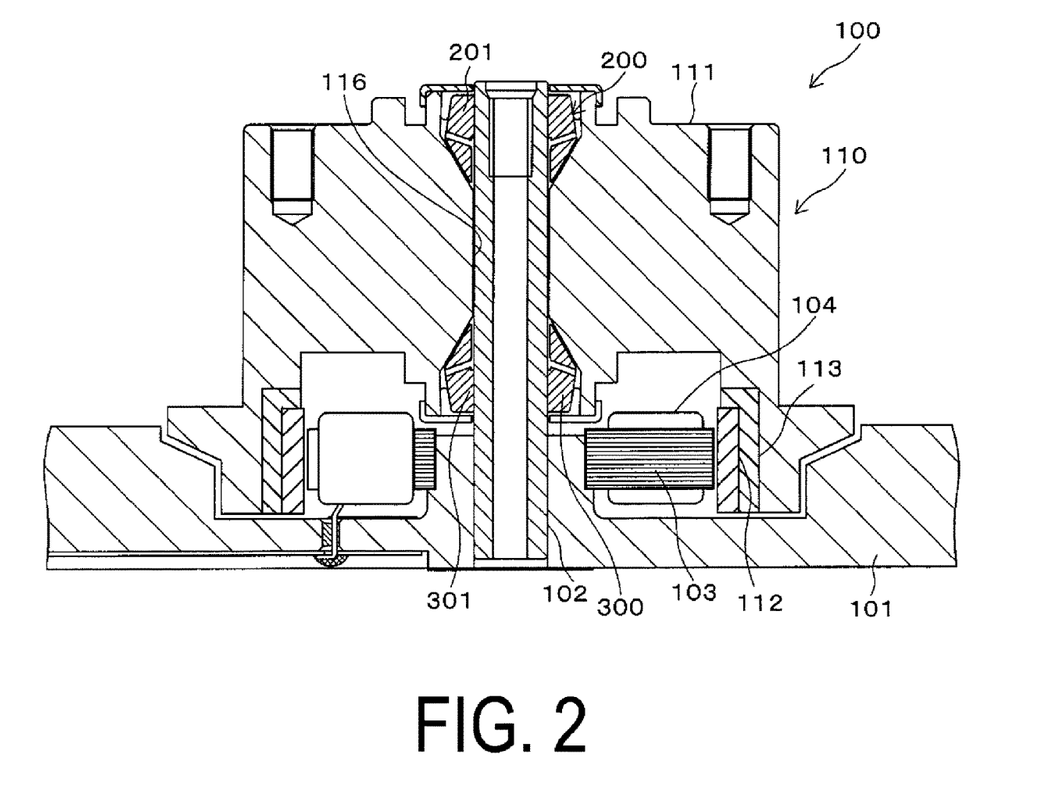
FIG. 2 is a cross-sectional view illustrating a spindle motor of the embodiment.

A shaft 102 is fixed to the base part 101. A stator core 103 is fixed to the base part 101. The stator core 103 is formed by layering a plurality of soft magnetic materials (for example, electromagnetic steel sheets) having a thin plate shape in an axial direction, has an annular shape, and includes a plurality of pole teeth protruding radially outward. The plurality of pole teeth are provided at equal intervals along a circumferential direction, and a stator coil 104 is wound around each pole tooth via an insulator (not illustrated).

A conical bearing member 201 and a conical bearing member 301 are fixed to the shaft 102, and a rotor 110 is supported by the conical bearing member 201 and the conical bearing member 301 in a rotatable manner with respect to the shaft 102. The conical bearing member 201 and the conical bearing member 301 are disposed at one end and the other end of the shaft 102.

Reference numeral 110 in the drawing denotes the rotor. The rotor 110 includes an outer cylindrical part 111, and a rotor magnet 112 is fixed to an inner peripheral surface of the outer cylindrical part 111 via a yoke 113. The rotor magnet 112 has an annular shape, and is magnetized so that portions adjacent along the circumferential direction alternately have different polarities, like SNSN . . . . An inner circumference of the rotor magnet 112 faces an outer circumference of the pole teeth of the stator core 103 with a gap.

When the polarity of a drive current supplied to the stator coil 104 is switched at a specific timing, a drive force for rotating the rotor magnet 112 is generated, and the rotor 110 rotates about the shaft 102 with respect to the shaft 102 and the base part 101. This mechanism is similar to that of a typical spindle motor.

3. Fluid Dynamic Bearing

A fluid dynamic bearing 200 and a fluid dynamic bearing 300 will be described below. The fluid dynamic bearing 200 includes the conical bearing member 201 fixed to the shaft 102, and the fluid dynamic bearing 300 includes the conical bearing member 301 fixed to the shaft 102. In the following description, the fluid dynamic bearing 200 will be described as an example. Furthermore, the following description will be made with reference to the conical bearing member 201, but the same description applies to the conical bearing member 301.

Figure 3:
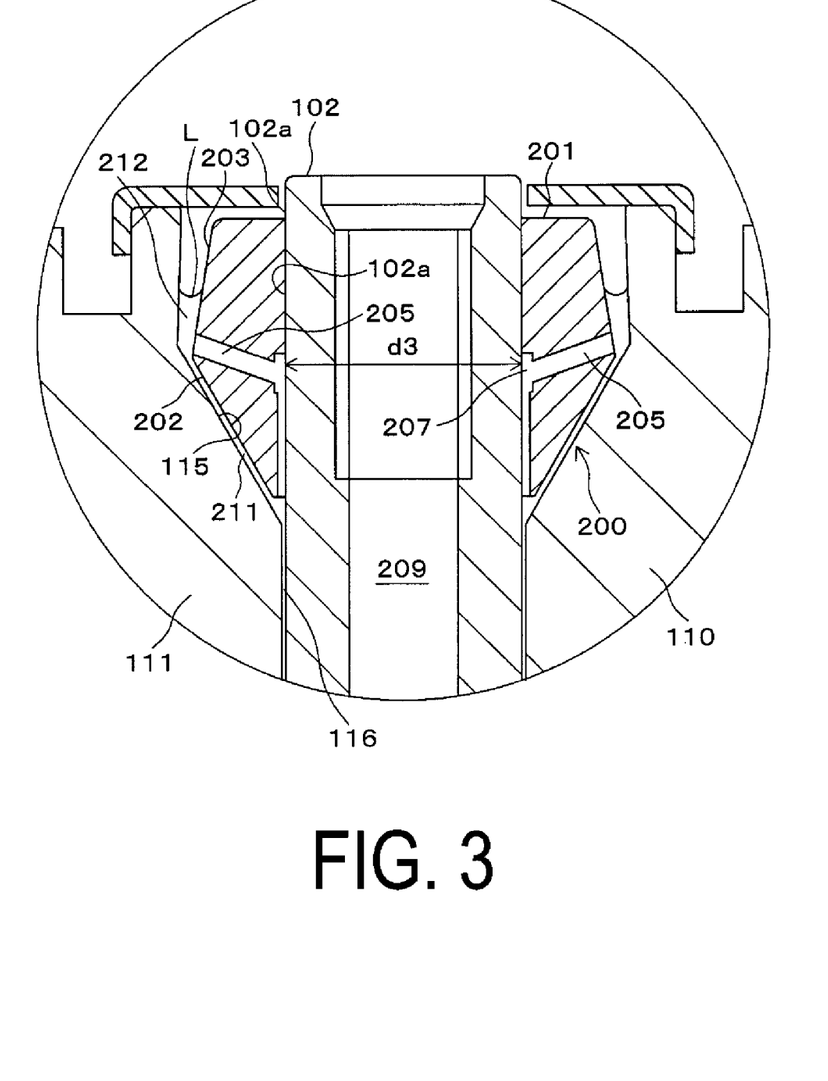
FIG. 3 is a cross-sectional view illustrating a main part of the spindle motor of the embodiment.
Figure 4A:
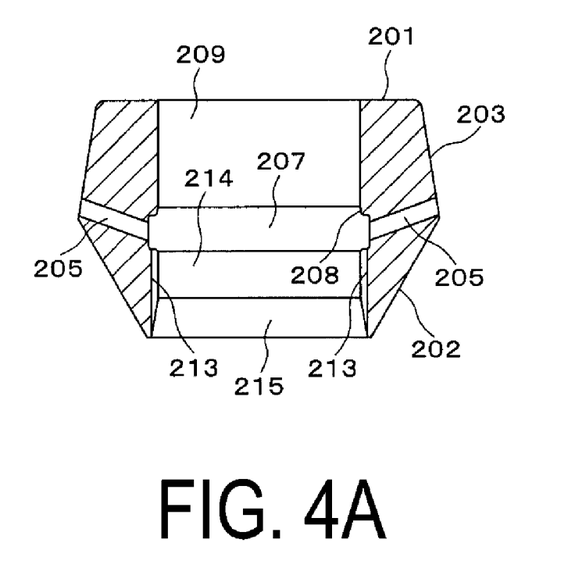
FIG. 4A is a cross-sectional view of a conical bearing member according to the embodiment.
Figure 4B:
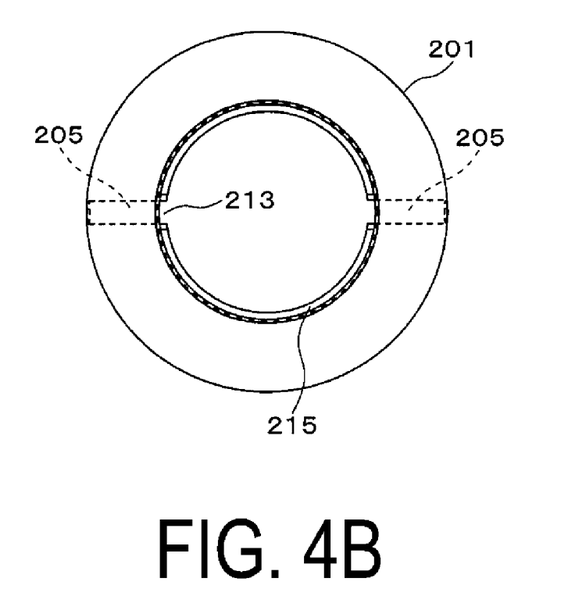
FIG. 4B is a plan view of the conical bearing member in FIG. 4A.
Figure 4C:
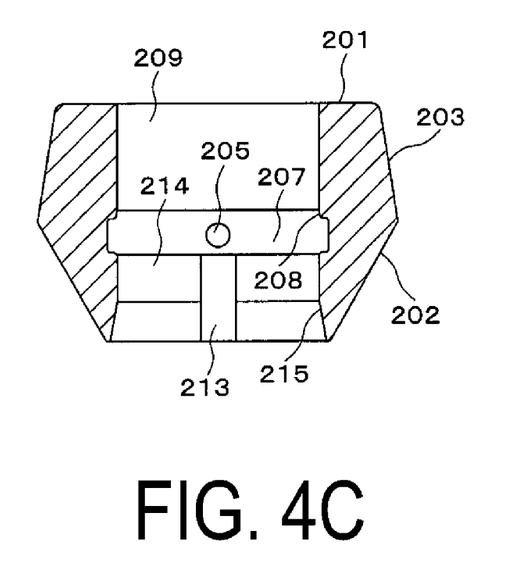
FIG. 4C is a cross-sectional view obtained by rotating FIG. 4A by 90°.
Figure 4D:
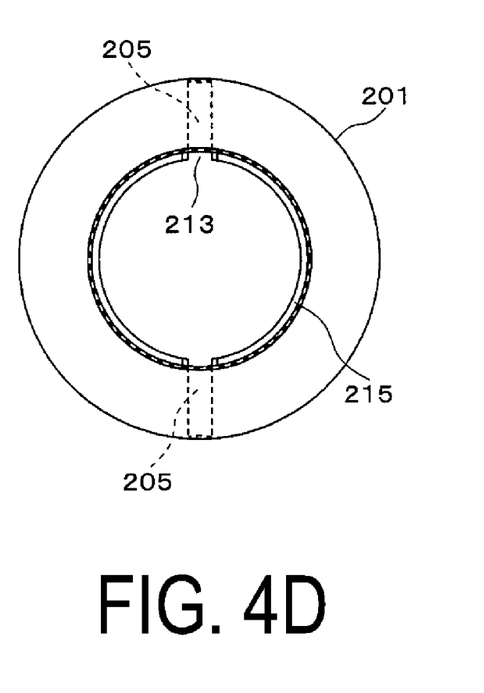
FIG. 4D is a plan view of the conical bearing member in FIG. 4C.

As illustrated in FIG. 3, a through hole 209 extending through the conical bearing member 201 in the axial direction is formed at the center of the conical bearing member 201, and the shaft 102 is press-fitted into the through hole 209, so that the conical bearing member 201 and the shaft 102 are coupled to each other. The coupling between the conical bearing member 201 and the shaft 102 may be performed using an adhesive.

The conical bearing member 201 includes a conical bearing surface 202 and a conical seal surface 203 as radially outer surfaces. The conical bearing surface 202 faces a rotor conical surface 115 provided at the rotor 110 with a minute gap 211. A dynamic pressure groove is formed at at least one of the conical bearing surface 202 and the rotor conical surface 115, and the gap 211 is filled with lubricating oil, so that the fluid dynamic bearing 200 is configured.

A tapered seal part 212 is provided between the conical seal surface 203 and the rotor 110. The tapered seal part 212 is formed over the whole circumference in the circumferential direction, and is formed in a tapered shape so that the dimension of a gap (gap between the conical bearing member 201 and the rotor 110) gradually increases upward from the bottom in the axial direction as illustrated in FIG. 3, and a liquid surface is positioned at the tapered seal part 212 to prevent leakage of the lubricating oil by a capillary force. In FIG. 3, the liquid surface of the lubricating oil held at the tapered seal part 212 is indicated by reference numeral L.

As illustrated in FIG. 4, the conical bearing member 201 is formed with communication holes 205 communicating an enlarged diameter region 207 to be described later and the tapered seal part 212. Two of the communication holes 205 are provided at intervals in the circumferential direction when viewed from the axial direction.

Figure 5A:
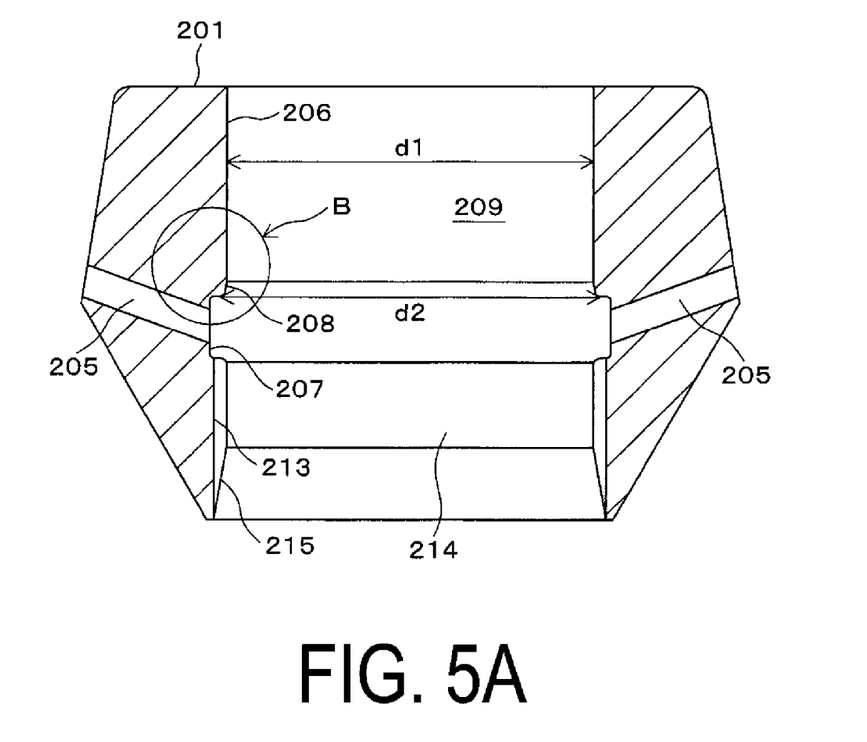
FIG. 5A is an enlarged cross-sectional view of FIG. 4A
Figure 5B:
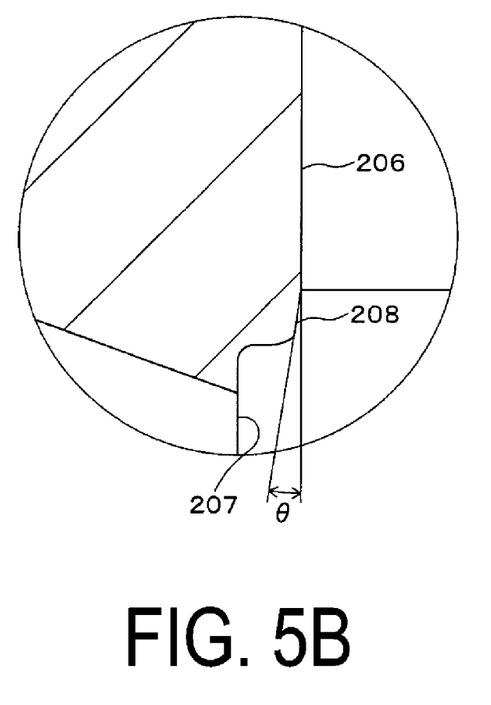
FIG. 5B is an enlarged view of a portion indicated by arrow B in FIG. 5A.

As illustrated in FIG. 5, the through hole 209 of the conical bearing member 201 includes a press-fit region 206 with a relatively small inner diameter, an enlarged diameter region 207 with a relatively large inner diameter, and a tapered part 208 located between the press-fit region 206 and the enlarged diameter region 207, the tapered part 208 having an inner diameter increasing toward the enlarged diameter region 207. The through hole 209 also includes a guide region 214 adjacent to the enlarged diameter region 207 and having the same inner diameter as the press-fit region 206 to be described below.

An inner diameter d1 of the press-fit region 206 is slightly smaller than an outer diameter d3 of a shaft press-fit region 102a (see FIG. 3) of the shaft 102, and the shaft 102 is press-fitted into the shaft press-fit region 102a. In this press-fit region 206, an inner peripheral surface of the conical bearing member 201 and an outer peripheral surface of the shaft 102 are in close contact with each other, and the conical bearing member 201 is fixed to shaft 102.

An angle θ of the tapered part 208 with respect to the axial direction is greater than 0° and less than 15°, and is preferably 7° to 13°. The outer diameter d3 of the shaft press-fit region 102a of the shaft 102 press-fitted into the press-fit region 206 is smaller than a maximum diameter d2 of the tapered part 208 and is greater than a minimum diameter d1 (inner diameter of the press-fit region 206) of the tapered part 208.

The through hole 209 of the conical bearing member 201 is formed with communication grooves 213 extending axially from parts of the enlarged diameter region 207 facing inner opening parts of the communication holes 205 to a lower end surface of the conical bearing member 201. Furthermore, a tapered region 215 adjacent to the guide region 214 is formed at a lower end part of the through hole 209, the tapered region 215 having an inner diameter increasing downward. An inner diameter at an opening edge part of the tapered region 215 is substantially equal to the dimension across the communication grooves 213 in the radial direction.

4. Manufacturing Method of Conical Bearing Member (1) Manufacturing of Conical Bearing Member A manufacturing method of the conical bearing member 201 having the above configuration will be described below with reference to FIG. 6. For example, a solid material of austenitic stainless steel (SUS304) is machined into a shape close to a finished product of the conical bearing member 201.

Figure 6A:
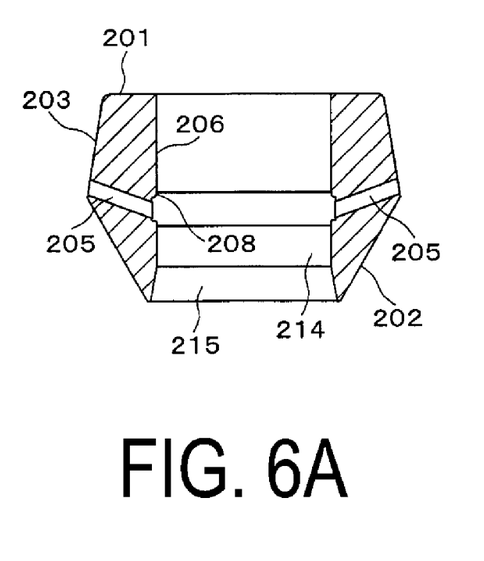
FIG. 6A is a view illustrating a state in which machining is terminated.

As illustrated in FIG. 6A, the conical bearing surface 202, the conical seal surface 203, the press-fit region 206, the tapered part 208, the guide region 214, and the tapered region 215 are machined, and the enlarged diameter region 207 is roughly machined (first machining step). Furthermore, the conical seal surface 203 is drilled by a drilling tool to machine the communication holes 205 extending to planned machining positions of the enlarged diameter region 207 (second machining step).

Figure 6B:
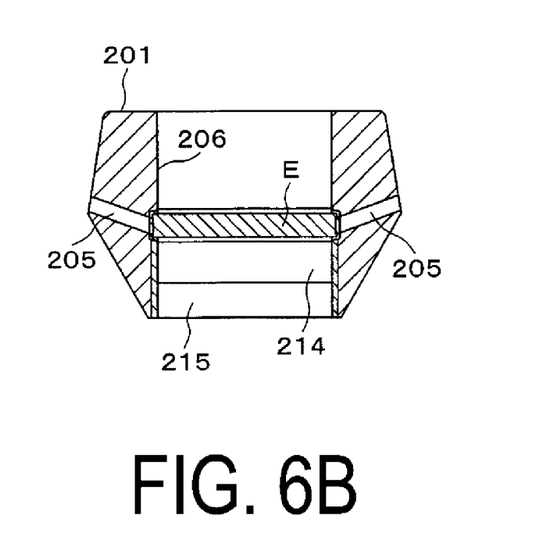
FIG. 6B is a view illustrating a location subjected to electrochemical machining.
Figure 6C:
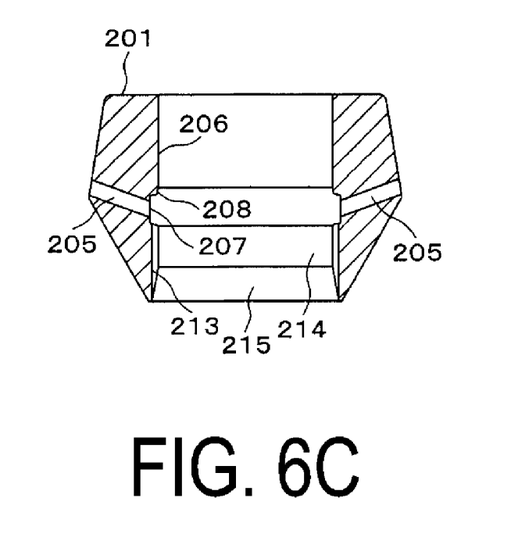
FIG. 6C is a view illustrating a state in which the electrochemical machining is terminated.

A component of the conical bearing member 201 machined as described above is immersed in an electrolyte, and an electrode is disposed at the component. The electrode has a shape corresponding to the finished dimension of the enlarged diameter region 207 and the communication grooves 213, and does not reach an upper end of the tapered part 208. Subsequently, an electric current is applied to the component and the electrode, and thus a region E in FIG. 6B is electrochemically machined. By the electrochemical machining, finish machining of the enlarged diameter region 207 and machining of the communication grooves 213 are performed (see FIG. 6C). Thus, an electrochemically machined region (the region E in FIG. 6B) includes the inner opening part of the communication hole, and is not provided on an end part of the tapered part 208 on a side of the press-fit region in the axial direction (the upper end of the tapered part 208).

(2) Press-Fitting of Shaft into Conical Bearing Member

A method of press-fitting the shaft 102 into the conical bearing member 201 will be described below with reference to FIG. 5.

The shaft 102 is made of, for example, martensite stainless steel (SUS420J2 or the like) having a high hardness by heat treatment. First, a distal end part of shaft 102 is inserted into the tapered region 215. The shaft 102 is centered at the tapered region 215 and press-fitted into the guide region 214. Subsequently, the distal end part of the shaft 102 is inserted into the enlarged diameter region 207.

Since the inner diameter of the guide region 214 is equal to the inner diameter of the press-fit region 206, the center of the shaft 102 substantially matches the center of the press-fit region 206. Subsequently, a distal edge part of the shaft 102 abuts the tapered region 208, the center of the shaft 102 is aligned with the center of the press-fit region 206, and the shaft 102 in this state is press-fitted into the press-fit region 206.

The above steps are performed outside the spindle motor 100. The conical bearing member 201 press-fitted with the shaft 102 is inserted into a through hole 116 (see FIG. 3) of the outer cylindrical part 111 of the rotor 110. Subsequently, the conical bearing member 301 is annularly fit from a lower end part of the shaft 102, and the shaft 102 is press-fitted into a press-fit region of the conical bearing member 301 in the same manner as described above. The press-fit region of the conical bearing member 301 has the same configuration as the enlarged diameter region 207, the tapered region 208, and the press-fit region 206 of the conical bearing member 201, and the same operation as the operation for the conical bearing member 201 is performed. As a result, the shaft 102 press-fitted with the conical bearing members 201 and 301 is prevented from moving in any axial direction, and the gaps 211 between the conical bearing members 201 and 301 and the rotor conical surfaces 115 of the cylindrical part 111 are filled with lubricating oil, so that the fluid dynamic bearings 200 and 300 are configured.

5. Operation and Effects

The fluid dynamic bearing 200 having the above configuration is provided with the tapered part 208 at the end part of the press-fit region 206 of the conical bearing member 201 on the enlarged diameter region 207 side, the diameter of the tapered part 208 increasing toward the enlarged diameter region. Thus, the distal edge part of the shaft 102 is smoothly press-fitted into the press-fit region 206 while expanding the tapered part 208. Consequently, even when the enlarged diameter region 207 is formed by electrochemical machining and the edge part of the enlarged diameter region 207 is not smooth, galling between the shaft 102 and the edge part of the enlarged diameter region 207 can be prevented. Thus, the accuracy of an axial clearance between the conical bearing surface 202 of the conical bearing member 201 and the rotor conical surface 115 of the outer cylindrical part 111 can be improved.

Particularly, in the above embodiment, the outer diameter of the shaft press-fit region 102a of the shaft 102 is smaller than the maximum diameter d2 of the tapered part 208 and is greater than the minimum diameter d1 of the tapered part 208. Thus, when the distal end part of the shaft 102 is inserted into the tapered part 208, the distal edge part of the shaft 102 abuts the tapered part 208 and is not in contact with the edge part of the enlarged diameter region 207 formed by electrochemical machining. Consequently, it is possible to reliably prevent galling between the shaft 102 and the edge part of the enlarged diameter region 207.

Furthermore, in the above embodiment, the guide region 214 is provided adjacent to the enlarged diameter region 207 and has the same inner diameter as the inner diameter of the press-fit region 206, so that the distal edge part of the shaft 102 can be reliably guided to the tapered part 208.

Moreover, the conical bearing member 201 is provided with the tapered region 215 adjacent to the guide region 214 and having an inner diameter gradually increasing toward the opposite side of the enlarged diameter region 207 in the axial direction, so that the shaft 102 can be reliably guided to the guide region 214.

6. Modification Examples

The present disclosure is not limited to the embodiment described above, and it is possible to make various modifications as described below.

Figure 6D:
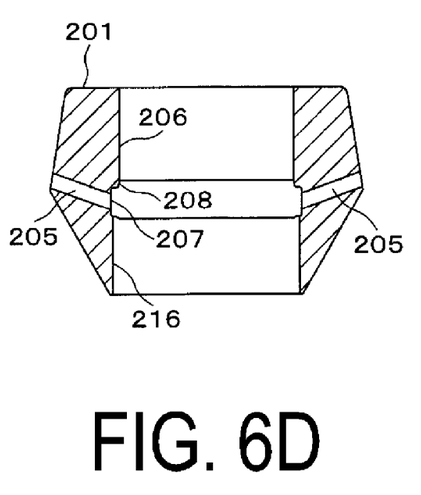
FIG. 6D is a view illustrating a modification of FIG. 6C.

(1) In the above embodiment, the communication grooves 213 extending in the axial direction are provided; however, as illustrated in FIG. 6D, an annular communication part 216 communicating over the entire circumference may be provided. The annular communication part 216 can be formed by machining.

(2) The annular communication part 216 can form a tapered region having an inner diameter gradually increasing toward an axial end part opposite to the enlarged diameter region 207. This makes it possible to achieve the same effects as the effects of the tapered region 215.

(3) In the above embodiment, a pair of the communication holes 205 are provided; however, three or more of the communication holes 205 may be formed. Furthermore, the communication grooves 213 can be provided at positions corresponding to the respective communication holes 205.

(4) The enlarged diameter region 207 can be formed by machining, and the communication grooves 213 can be formed by electrochemical machining. As a result, the edge part of the enlarged diameter region 207 can be smoothed, so that galling at the edge part can be reliably prevented.

The present disclosure can be used for a fluid dynamic bearing and a spindle motor using the fluid dynamic bearing.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A fluid dynamic bearing comprising:
a conical bearing member press-fitted with a shaft, wherein
the conical bearing member includes a communication hole configured to communicate an inner peripheral surface and an outer peripheral surface of the conical bearing member,
the inner peripheral surface includes a press-fit region in contact with the shaft and an enlarged diameter region having a larger diameter than the press-fit region and including an inner opening part of the communication hole,
wherein the conical bearing member includes a guide region adjacent to the enlarged diameter region, the guide region having an inner diameter identical to an inner diameter of the press-fit region, and
a tapered part is provided at an end part of the press-fit region on a side of the enlarged diameter region, the tapered part having a diameter increasing toward the enlarged diameter region.

2. The fluid dynamic bearing according to claim 1, wherein an angle of the tapered part with respect to an axial direction is greater than 0° and less than 15°.

3. The fluid dynamic bearing according to claim 1, wherein
the shaft includes a shaft press-fit region press-fitted into the conical bearing member, and
an outer diameter of the shaft press-fit region is smaller than a maximum diameter of the tapered part and greater than a minimum diameter of the tapered part.

4. The fluid dynamic bearing according to claim 1, wherein the conical bearing member includes a tapered region adjacent to the guide region, the tapered region having an inner diameter gradually increasing toward an opposite side of the enlarged diameter region in an axial direction.

5. The fluid dynamic bearing according to claim 1, comprising
an electrochemically machined region obtained by electrochemically machining a part of the inner peripheral surface of the conical bearing member, wherein
the electrochemically machined region includes the inner opening part of the communication hole, and
is not provided on an end part of the tapered part on a side of the press-fit region in an axial direction.

6. The fluid dynamic bearing according to claim 1, wherein the tapered part includes a machined surface.

7. A spindle motor comprising the fluid dynamic bearing according to claim 1.

8. A disk drive device comprising the spindle motor according to claim 7.

* * * * *